(12) United States Patent
Myers

(10) Patent No.: US 11,262,462 B2
(45) Date of Patent: Mar. 1, 2022

(54) DETECTION METHOD AND DETECTOR APPARATUS FOR CORRECTING COUNT RATE FOR DEAD TIME

(71) Applicant: Johnson Matthey Public Limited Company, London (GB)

(72) Inventor: Nathan Myers, Cleveland (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/981,041

(22) PCT Filed: Mar. 13, 2019

(86) PCT No.: PCT/GB2019/050707
§ 371 (c)(1),
(2) Date: Sep. 15, 2020

(87) PCT Pub. No.: WO2019/180407
PCT Pub. Date: Sep. 26, 2019

(65) Prior Publication Data
US 2021/0109236 A1    Apr. 15, 2021

(30) Foreign Application Priority Data
Mar. 23, 2018  (GB) ..................... 1804743

(51) Int. Cl.
*G01T 1/20*    (2006.01)
*G01T 1/17*    (2006.01)

(52) U.S. Cl.
CPC ............ *G01T 1/171* (2013.01); *G01T 1/2018* (2013.01)

(58) Field of Classification Search
CPC .............................. G01T 1/171; G01T 1/2018
See application file for complete search history.

(56) References Cited

U.S. PATENT DOCUMENTS 3,585,388 A  6/1971 Laney
3,732,422 A  5/1973 Brunson et al.
(Continued)

FOREIGN PATENT DOCUMENTS

JP   2015-025717 A   2/2015
WO   2013/064838 A1   5/2013

OTHER PUBLICATIONS

International Search Report of the International Searching Authority for PCT/GB2019/050707 dated Jun. 17, 2019.

(Continued)

*Primary Examiner* — Kiho Kim
(74) *Attorney, Agent, or Firm* — BakerHostetler

(57) ABSTRACT

A method of detection of radiation is described. The method comprises providing at least one source of radiation; providing at least one detector capable of detecting radiation from the source; causing said source to emit radiation along a predetermined radiation path towards said detector; during a measurement period, detecting successive count events corresponding to photons from the source detected by the detector; measuring a duration of each such count event to determine a dead time associated with each count event; calculating a total dead time for the measurement period as the sum of each determined dead time associated with each count event; determining a photon count rate from the total number of count events during the measurement period; calculating a corrected count rate by applying a correction factor based on subtracting the total dead time from the measurement period. A method of scanning an object and apparatus for performing the methods are also disclosed.

13 Claims, 2 Drawing Sheets

(56) References Cited

U.S. PATENT DOCUMENTS

| | | | |
|---|---|---|---|
| 4,309,606 A | | 1/1982 | Bjoerkman et al. |
| 4,338,521 A | | 7/1982 | Shaw et al. |
| 4,772,793 A | * | 9/1988 | Larson ................. G01T 1/171 250/374 |
| 9,897,558 B2 | | 2/2018 | Bowdon et al. |
| 10,641,716 B2 | | 5/2020 | Bowdon et al. |
| 2015/0241572 A1 | | 8/2015 | Bowdon et al. |
| 2016/0209520 A1 | | 7/2016 | Abraham et al. |
| 2018/0011208 A1 | | 1/2018 | Bowdon et al. |
| 2019/0331615 A1 | | 10/2019 | Bowdon et al. |

OTHER PUBLICATIONS

Search Report of the Intellectual Property Office of the United Kingdom for GB1804743.1 with report dated Sep. 21, 2018 and search date of Sep. 20, 2018.
Combined Search and Examination Report of the Intellectual Property Office of the United Kingdom for GB1903434.7 with report dated Sep. 13, 2019 and search date of Sep. 12, 2019.

* cited by examiner

DETECTION METHOD AND DETECTOR APPARATUS FOR CORRECTING COUNT RATE FOR DEAD TIME

FIELD OF INVENTION

The present invention concerns methods of detection of radiation emitted by a radiation source by a radiation detector and apparatus for application of such methods. The invention in particular concerns methods of dead time correction of the data collected from such a radiation detector.

BACKGROUND

Methods of imaging objects and animals by X-ray tomography and positron-emission tomography are well-known, particularly in the field of medical imaging for diagnostic purposes. U.S. Pat. No. 4,338,521 describes an X-ray scanner for use in computerised tomography which has a detector comprising an array of detector modules, comprising a plurality of photodiodes and a plurality of scintillator crystals and a radiation beam collimator to direct collimated radiation to the scintillator crystals. A fan-shaped beam of x-rays from an x-ray source is directed through a patient to be detected by the detector. The source and detector are rotated around the patient to provide the data from which a tomographic image may be constructed. In positron-emission tomography (PET) a positron emitted by the decay of a radionuclide annihilates on contact with a suitable electron, causing the emission of two gamma photons of 511 keV in opposite directions. The detection of the direction of the gamma photons enables the estimation of the location of the annihilation event and thus the radionuclide within the patient. The PET scanner therefore incorporates an array of detectors which can detect gamma photons placed around the body of a patient. An image of the relative concentration of the radionuclide in the body may be constructed from the number of photons detected at each detector.

For detection systems based on the detection of discrete events, such as the scintillator detectors commonly used to detect gamma photons, the detector necessarily takes a finite period of time to perform detection of a photon emitted by the scintillator. During this period, additional photons may not be detected. This period of time after an event during which the system is unable to record a further event is generally called the dead time of the system. As a result, the total number of emissions may be under counted, especially at higher event count rates.

It is routine that the count of detected emissions is corrected for this period of dead time. In a known approach, a dead time for a system may be determined for example experimentally and a correction applied. For example in the case of gamma scintillator detectors a commonly used correction calculation is the relationship:

$$\text{corrected\_(real)\_count\_rate} = \text{measured\_count\_rate}/(1-(\text{dead\_time\_per\_event} * \text{measured\_count\_rate}))$$

What this and similar relationships have in common is that they assume a system dead time per event that can be determined for example by measurement. In effect, they assume an average per event dead time across a measurement period, and multiply by the number of events to get a total dead time for the measurement period, basing the correction on that.

Although methods of imaging objects and animals by X-ray tomography and positron-emission tomography are well-developed and have become common for medical scanning, scanning a dense structure such as a pipeline presents difficulties because the density of the pipeline material is such that radiographic scanning must be done using gamma radiation which is of sufficient energy to penetrate and pass through the structure so that at least some radiation can be detected after the beam has passed through the structure.

The inspection of pipelines to find flaws such as wall loss, cracks or corrosion pitting is an application in which it would be desirable to use radiation scanning. A known problem for the oil and gas production industry is the inspection of pipelines located underwater, in particular on the sea-bed. Inspection of the interior of the pipeline by the use of pigs is not always possible, for example when the pipeline has varying diameter. Inspection from outside the pipe may be carried out by ultrasonic methods, although this is not suitable for pipelines having an insulation or coating. Gamma scanning can produce useful information about the density through a cross-section of the pipe. WO2013/064838 describes a method and apparatus for scanning a structure such as a subsea pipeline to detect changes in density by means of detecting gamma radiation emitted by a gamma radiation source.

In order to produce information about the thickness of the walls of the pipe at sufficiently high resolution to identify small flaws that may be present in the walls of the pipe a large number of radiation paths through the pipe need to be scanned. Furthermore, if a fan-shaped radiation beam is to be used to scan the pipe, many of the radiation paths pass through a chord of the pipe cross-section and therefore through a relatively large amount of the pipeline wall material, requiring a relatively high energy gamma source. In order to detect the gamma radiation that has passed through the structure it is necessary to use detectors of sufficient size and density to stop the gamma photons so they do not pass through the detector undetected. In order to maintain a high resolution the collimation of the detectors has to be sufficient to significantly reduce detection of gamma photons which have been scattered from a path other than the direct path to a particular detector. The detectors need to be small enough to provide good spatial resolution. A large number of detectors is needed to achieve a reasonable measurement time. The use of heavy collimation on a large number of detectors necessitates a scanning apparatus which is very heavy and so rotation of the apparatus in a controlled and precise manner around a large pipeline becomes very difficult. When the pipeline is horizontal, it becomes necessary to trench the pipe in order to allow sufficient space in which to move a scanning apparatus and so the use of large apparatus becomes expensive, particularly when the pipeline is located sub-sea. All of these considerations bring particular problems to the application of high resolution x-ray tomography methods to the scanning of pipelines or other large structures with high energy gamma radiation.

Gamma ray detection is conventionally based on the use of scintillator coupled to a photodetector. The photodetector may be a photodiode, photomultiplier tube (PMT), silicon photomultipliers or avalanche photodiode or other suitable light detecting device. For many applications, higher count rate photodetectors such as silicon photomultipliers or avalanche photodiodes may become preferable as technology develops. Accurate dead time correction becomes particularly important if the advantages offered by higher count rate photodetectors are to be exploited.

The present invention seeks to provide alternative methods of dead time correction and to provide improved detection and scanning methods and apparatus.

SUMMARY OF THE INVENTION

According to a first aspect of the invention there is provided a method of detection of radiation emitted by a radiation source by a radiation detector, the method comprising:

providing at least one source of radiation;

providing at least one detector capable of detecting radiation from the source;

causing said source to emit radiation along a predetermined radiation path towards said detector;

during a measurement period, detecting successive count events corresponding to photons from the source incident upon and detected by the detector;

measuring a duration of each such count event to determine a dead time associated with each count event;

calculating a total dead time for the measurement period as the sum of each dead time associated with each count event;

determining a photon count rate from the total number of count events during the measurement period;

calculating a corrected count rate by applying a correction factor based on subtracting the total dead time from the measurement period.

According to a second aspect of the invention there is provided an apparatus for detection of radiation emitted by a radiation source by a radiation detector, the apparatus comprising:

at least one source of radiation;

at least one detector capable of detecting radiation from the source;

data collection and processing means associated with the detector for:

detecting successive count events corresponding to photons from the source incident upon and detected by the detector;

measuring a duration of each such count event to determining a dead time associated with each count event;

calculating a total dead time for the measurement period as the sum of each determined dead time associated with each count event;

determining a photon count rate from the total number of count events during the measurement period;

calculating a corrected count rate by applying a correction factor based on subtracting the total dead time from the measurement period.

The invention is in particular intended to be applied to methods and apparatus which make use of at least one radiation source and at least one radiation detector to obtain information about a target object within the radiation path between them. The radiation is accordingly preferably a suitable penetrating radiation, for example a suitable high energy electromagnetic radiation such as x-ray or gamma radiation. In a particularly preferred case, the radiation is gamma radiation. The radiation source is a source of such radiation, and the radiation detector is a detector capable of detecting such radiation.

In a preferred case, the detector comprises a scintillator and a photodetector.

The invention is characterised in the way in which a correction for dead time is made, and in particular in the way in which the dead time is more accurately and directly measured.

Dead time correction is ordinarily applied by performing a calculation based on a measured count rate and a notional dead time per event, whereby a corrected count rate is generated by dividing the raw count rate by a correction factor that makes use of a total dead time assumed to be the product of the dead time per event and the number of events.

The invention by contrast firstly involves measuring the actual dead time during a sample period rather than calculating it based on an average, and then using that measured dead time to effect a count rate correction. A scaling factor is applied to the measured count rate that is based on a subtraction of the measured dead time from the total time. This alternative method is potentially more accurate because it is based on a direct measurement rather than an assumption based on average dead time per event.

This is more accurate in particular because the real dead time is not a system constant but has been found to vary with the energy of the event. Typically, events with greater energy cause the electronics to take longer to recover to the point where they could identify the next event, and accordingly produce longer periods of real dead time. Taking proper account of this enables the processing duration to be optimised to be as fast as possible.

It therefore becomes likely to be important to the invention than the data processing means associated with each detector is capable of the fastest possible electronic sampling and processing of event data. The data processing means preferably comprises a fast solid state event sampling module which is for example an analogue to digital converter (ADC) and a fast solid state data analysis module which for example includes a field programmable gate array (FPGA) in combination with a suitable microprocessor. The step of detecting successive count events is preferably performed by using such an event sampling module which is for example an analogue to digital converter (ADC). The further data processing steps of the method are preferably performed by using such a data analysis module which for example includes a field programmable gate array (FPGA) in combination with a suitable microprocessor. The steps of measuring a duration of each such count event to determine a dead time associated with each count event and determining a total dead time for the measurement period as the sum of each dead time associated with each count event and determining the total event count are for example carried out using the FPGA. the microprocessor reads these (after the end of the sample period) to perform the subtraction (sample duration—dead time duration) and the calculation of corrected count rate.

In a preferred case, the detector comprises a scintillator and a photodetector. In such a preferred case, the method comprises causing the source to emit radiation towards said detector such as to be incident upon said scintillator, and detecting successive count events corresponding to photons from the source incident upon said scintillator by detecting a luminscence response of said scintillator in the photodetector.

Typically, an event is sampled in the familiar way by a pulse height threshold/peak analysis, for example of the voltage response in the photodetector. That is to say, an event is counted when a pulse amplitude and for example a pulse voltage rises above a predetermined measurement threshold value from below that predetermined measurement threshold value, a peak pulse height and for example a peak pulse voltage for the event is measured, and an event duration is measured as the time duration that the pulse amplitude remains above the measurement threshold value or alternatively for the time duration that the pulse amplitude remains above some second predetermined threshold value. A measured dead time in accordance with the principles in the invention may be this event duration or may otherwise be functionally related to this event duration. For example, a cumulative count register and a cumulative dead time register may be maintained. In the event of a peak being sampled, the count register is incremented by one and the dead time register is incremented by the measured dead time. At the end of the measurement period a reported total count is produced from the count register and a reported total dead time from the dead time and these are used to perform a correction as above.

In a refinement of the method, with the intention of discarding peaks which have been generated by multiple overlapping photon interactions, a measurement window is predetermined comprising an upper and lower bound for peak pulse signal amplitude, and a reported count is produced based only on counts for events where the pulse signal amplitude is between the said upper and lower bounds. That is to say, a peak pulse height is determined but a count is only recorded in a count register if the peak pulse height is within the window. Other peaks outside the window are not recorded as counts in the count register. However, in this refinement of the method, the dead time duration is measured for all events, including those which have the peak pulse height not within the window and have been discarded and not recorded in the count register.

In a preferred case, a plurality of detectors is provided. Preferably, a separate calculated dead time correction in accordance with the foregoing principles is applied to each such detector. Optionally, a detector may be operated at a plurality of sampling energies. Preferably, a separate calculated dead time correction in accordance with the foregoing principles is applied at each sampling energy. In a case where plural detectors are operated at a plurality of sampling energies, preferably the dead time correction is applied individually to each sample energy for each detector.

The application of the dead time correction individually and separately to each sample energy and/or each detector in a multi-detector scanner minimises the required band width for data from each detector during scanning.

Thus according to this more complete embodiment of the first aspect of the invention there is provided a method of detection of radiation emitted by a radiation source by a multi-detector radiation detector, the method comprising:
providing at least one source of radiation;
providing a plurality of detectors capable of detecting radiation from the source;
causing said source to emit radiation along a predetermined radiation path towards each said detector;
during a measurement period, for each detector separately:
detecting successive count events corresponding to photons from the source incident upon and detected by the detector;
measuring a duration of each such count event to determine a dead time associated with each count event;
calculating a total dead time for the measurement period as the sum of each determined dead time associated with each count event;
determining a photon count rate from the total number of count events during the measurement period;
calculating a corrected count rate by applying a correction factor based on subtracting the total dead time from the measurement period.

Similarly, there is provided according to a more complete embodiment of the second aspect of the invention an apparatus for detection of radiation emitted by a radiation source by a multi-detector radiation detector, the apparatus comprising:
at least one source of radiation;
a plurality of detectors capable of detecting radiation from the source;
data collection and processing means associated with each detector for, for each detector separately:
detecting successive count events corresponding to photons from the source incident upon and detected by the detector;
measuring a duration of each such count event to determine a dead time associated with each count event;
determining a photon count rate from the total number of count events during a measurement period;
calculating a total dead time for the measurement period as the sum of each determined dead time associated with each count event;
determining a photon count rate from the total number of count events during the measurement period;
calculating a corrected count rate by applying a correction factor based on subtracting the total dead time from the measurement period.

Preferably each detector comprises in familiar manner a scintillator comprising a scintillating material and a photodetector. The scintillating material is selected according to the properties of the radiation which is to be detected and the conditions in which the detector is deployed. In principle, any suitable scintillating material may be selected and many materials are known and marketed for the detection of radiation. A high density material provides a greater capacity to stop radiation in a given volume and consequently the scintillator can be made smaller than would be possible for a lower density material. A small scintillator is more stable, for example it is less likely to exhibit a temperature differential between different parts of the crystal. Smaller crystals transmit light more effectively requiring lower-powered photo-detectors to be used. A small scintillator can have a small detecting surface and so radiation travelling along a narrow path can be detected without a significant amount of incident radiation from background or scattered radiation from the same or different paths.

For some applications it may be preferred to use a dense inorganic material so that the incident photons may be stopped using as small a detector as possible. Scintillating materials having a density >5 and a high Z-number (atomic number) are preferred. It is preferred that the scintillator(s) have a depth and density that enable them to stop >80% of gamma photons of energy of 662 keV.

For use in applications requiring resistance to environmental conditions, especially moisture, a non-hygroscopic crystal scintillator should be selected. Especially preferred detectors for use with gamma radiation include BGO (bismuth germanate), $CdWO_4$, $LaBr_3(Ce)$, LYSO (lutetium yttrium oxyorthosilicate—cerium doped), LSO (lutetium oxyorthosilicate—cerium doped) and $CeF_3$ (cerium fluoride). When a mechanically rugged detector is required, a crystal having no cleavage planes may be preferred in order to increase its resistance to shattering following a thermal or mechanical shock.

For other applications, it may be preferred to use a plastic scintillator, for example comprising a material in which a primary fluorescent emitter is carried in a solid base of a polymeric material.

Each scintillator has a detecting surface, which, in use is arranged to intersect the radiation path so that the radiation impinges upon the detecting surface. Other surfaces of the detector which are not arranged to be detecting surfaces will be referred to as non-detecting surfaces. Although any part of a scintillator is normally capable of detecting photons, the designation in this specification of detecting surfaces and non-detecting surfaces refers to the arrangement of the scintillator in a detector for detecting radiation from a source. Each scintillator has a detecting surface defined by its thickness t and height h. Preferably t<h at the detecting surface. Preferably the scintillator has a depth d perpendicular to the detecting surface at least 2t.

The scintillator also has a surface through which light generated by the scintillator in response to photons impinging upon the detecting surface leaves the scintillator. This surface is referred to herein as the collecting surface. The collecting surface is arranged in optical communication with the photodetector. The collecting surface can be in contact with the photodetector or it may be separated therefrom by one or more light transmitters, in the form of a window, lens, optical fibre, light pipe or optically coupling material etc. made from a material which transmits the light generated by the scintillator to the photodetector. The collecting surface of the detector may have a similar cross-sectional area and shape to that of the photodetector window or it may be different. The detector itself may act as a light guide to pass a substantial proportion of the light generated in the scintillator to the photodetector. In this context, the use of the phrase "substantial proportion" means all of the light generated in the scintillator is passed to the photodetector, save for a proportion of light that is unintentionally lost due to the efficiency of the light transmission being less than 100%.

Each of the detectors comprises a scintillator, normally supported in a suitable position so that the detecting surface intersects a path of radiation emitted by the source at a particular distance from and a particular angle to the radiation source. It is a particular feature of the invention that the detector can substantially reduce the detection of scattered radiation and increase the precision with which radiation emitted by a source along a particular linear path is detected. The provision of a detector having an elongate shape in which t<h, more preferably <0.5 h, at the detecting surface enables the detectors to be located in close proximity so that spatial resolution of each detector is high. The depth of the detector contributes to the stopping efficiency of the detector so that a detector having a depth d perpendicular to the detecting surface at least 2t, more preferably at least 5t, especially >10t is preferred in order to stop and measure energetic photons.

The smallest dimension of the detecting surface of the scintillator is preferably between about 1 mm and about 10 mm. The smallest dimension is defined to be the thickness t of the material. More preferably, 1 mm<t<5 mm and in a preferred embodiment t is about 5 mm. Preferably the detecting surface is generally rectangular so that the area of the surface is defined as t×h, where h is in the range 5-100 mm. More preferably, 10 mm<h<50 mm and in a preferred embodiment h is about 25-40 mm. The depth, d of the scintillator is in the range 10-100 mm. More preferably, 25 mm<d<75 mm and in a preferred embodiment d is about 40-60 mm.

A material which is impermeable to the radiation may cover a part of the detecting surface of the scintillator to delimit the portion of the detecting surface on which radiation may impinge. The collimator may overlap and cover one or more edges of crystal by up to about 5 mm.

The detection of scattered photons is preferably further reduced by preventing the detectable radiation from impinging upon the surfaces of the detector which are not detecting surfaces. This may typically be achieved by covering the non-detecting surfaces, except for the portion of the collecting surface in optical communication with the photodetector, with a material which prevents transmission of the radiation to the non-detecting surfaces. In a preferred embodiment the detectors are surrounded by shielding material so that all of the non-detecting surfaces, except for the portion of the collecting surface in optical communication with the photodetector, are protected from radiation. By shielding material we mean a material which is highly attenuating to the radiation which is to be detected by the detector. Typically, a shielding material for protection from ionising radiation such as gamma radiation includes lead and heavy metal alloys. Such materials are well known to persons skilled in the art of designing radiation detectors and nucleonic instruments.

When the scintillator is thin, scintillation light generated as a result of the interaction of a gamma photon with the scintillation material is likely to be internally reflected several times before it enters the photodetector. Since each reflection may be less than 100% efficient, the capacity for multiple reflections provides multiple opportunities for loss of light and thus a decrease in the detection efficiency of the detector. It is therefore preferred to provide the non-detecting surfaces with means to reflect light internally within the detector. Preferably the non-detecting surfaces are coated with a super-reflective coating, capable of reflecting at least 95% of the light within the scintillator and more preferably at least 98% of that light.

A detector unit may be provided comprising one or more detectors. When the detector unit comprises more than one detector, deployed in the form of an array of detectors, a preferred embodiment of the invention comprises a block of shielding material (a "detector block") having openings extending inwardly from a surface of the block, each opening containing a detector, the detecting surface being accessible to radiation from outside the block. A portion of the detecting surface may be covered by shielding material for the purposes of delimiting the area of the detecting surface or for mechanically retaining the detector within the opening. The non-detecting surfaces of the detector may optionally be enclosed partially or wholly within the opening and covered by the shielding material. The detector block includes means by which the collecting surface of the scintillator(s) may be brought into contact with a photodetector or a light transmitter. Such means may take the form of an open passage through which the scintillator extends so that the collecting surface is accessible to the photodetector or light transmitter. The precision of the detector may be increased by providing collimation means for restricting the path along which radiation may travel to the detecting surface. The collimation means preferably comprises a collimator formed from a shielding material and arranged so that radiation travelling towards the detecting surface from selected directions may contact the detecting surface whilst radiation travelling from non-selected directions is excluded from the detecting surface. In this way, only radiation travelling along selected paths from a radiation source to the detector may be detected. The collimation may be arranged so that radiation from one or more selected radiation sources is detected. Suitable design of the collimation can significantly reduce the detection of scattered photons, which are usually deflected from the path along which they were emitted by the source. Alternatively, the collimation may be designed so that scattered photons and other secondary radiation is detected preferentially. In a preferred embodiment the collimation means comprises a block of shielding material having a channel, or preferably a plurality of channels extending through. The collimator block comprises a plurality of channels, each channel being formed through the block and corresponding in position to one of the detectors in said array. Each channel is shaped to define the path of radiation which is to be detected by each scintillator. Each channel has an opening at the end proximal to the scintillator which is preferably mounted over the detecting surface of the scintillator so that the detecting surface, or a portion of it, is within the opening of the channel. The end of a channel distal to the scintillator is open to allow radiation to enter the channel and travel to the scintillator. The opening preferably lies on the plane of a tangent to a circle having the source as its origin. The area of the distal opening defines the maximum useful area through which radiation can pass to the detecting surface. The channel walls are normally straight. The length of the channel(s) is determined according to the requirements of the detector and the energy of radiation emitted by the source. A longer channel reduces the detection of scattered or reflected radiation more than a shorter channel and so the resolution of detection of a particular path of radiation is higher. The length of the collimation channels may be determined by the skilled person according to the type of radiation which is to be collimated, in accordance with known principles of physics. Generally for collimating radiation from a caesium source (which is a preferred source for use in the method and apparatus of the invention), a collimation depth of at least 50 mm should be used. A cobalt source requires more collimation and generally a depth of at least 75-80 mm would be used. Americium emits less energetic gamma radiation and requires only about 20 mm of collimation depth. Americium may be used in some applications but would not be suitable for use in scanning steel pipelines, which is a preferred application. The depth, d of the collimator channels is preferably in the range from 30-150 mm. More preferably d<150 and, for use with a caesium source suitable for scanning large pipelines d is most preferably about 80-120 mm.

The cross-section of the channel may be any convenient shape, although it is preferred that the channel has the same shape and orientation as the detecting surface. Often, the channel has a generally rectangular cross section. The shape and/or size of the channel cross-section may change along the length of the channel, or they may remain substantially constant. In a preferred embodiment, at least one of the collimator channels has at least one wall defining the channel which is aligned with a radius of a circle having the source as its origin. Preferably each of the walls of the channel is aligned with a different radius of said circle so that the opening of the channel is aligned to face directly towards the source.

Preferably, in such an arrangement the end of the collimator distal to the scintillator has an opening lying on the plane of a tangent to a circle having the source as its origin. In this way the detection of photons travelling in a straight line from the source, through the target structure along the collimator channel to the detector may be maximised for any given area of detecting surface. More preferably all of the collimator channels have at least one wall and preferably all of their walls, aligned with the radius of a circle having the source as its origin. In such an arrangement the walls of the collimator channels are not parallel to each other and all of the channels face the direction of the source. When this alignment of the collimator channels is adopted, and the array of detector units is arranged in an arc having an origin which is not the source, at least some the collimator channels do not extend in a direction which is perpendicular to a tangent to that arc. This is a preferred arrangement for scanning a cylindrical structure such as a pipeline. In order to produce the collimator channels having this preferred alignment, it is preferred to form each channel in a block of shielding material by means of a machining method. For this reason, the use of plates of shielding material, e.g. steel plates, of the type found in the detector units of x-ray tomography apparatus (for example as described in U.S. Pat. No. 4,338,521) is not preferred.

In one embodiment of the apparatus of the invention, the detector unit comprises a collimator block and a detector block, joined together such that the proximal end of each channel is in register with the detecting surface of a detector. The detector block and collimator block are joined together so that the connection between them does not allow radiation to impinge on the detecting surface of a detector which has not travelled through a channel in register with the detecting surface. It may be possible to form the detector block and the collimator bloc from a single piece of shielding material but it is normally easier to manufacture them separately and then join them together.

The collimator block may be formed from a dense shielding material such as lead or a heavy alloy which attenuates gamma radiation. Alternatively, the collimator block may be formed, at least in part, from a less dense material, such as steel for example, which provides less shielding but which is not as heavy as the more dense shielding materials such as lead or heavy alloy. In one version of such a collimator, collimator channels are formed from a first material, such as steel, and a layer of a second material, such as a heavy alloy, having a greater shielding capacity than the first material, is positioned over at least one external surface of the detector unit.

In this way the detector unit may be better protected from the impact of scattered radiation from selected directions than from other directions. In practice, it is possible to determine, by calculation and/or modelling, the probability at which gamma radiation scattered from particular angles will impinge upon the detector unit. This information may then be used to provide more shielding over those surfaces of the detector unit at which scattered gamma photons are more likely to contact the detector units. More shielding can be provided either by using a more dense material or by increasing the thickness of the shielding material. One advantage of providing different shielding at different parts of the detector unit, or forming the detector unit from different materials is that the weight of the detector unit can be reduced whilst the shielding and collimation of the detectors is substantially maintained. A further advantage of using a material such as a steel to form at least a part of the collimator is gained if the material has greater structural strength than a traditional dense shielding material such as lead or heavy alloy so that less structural support must be used to support the collimator block.

The photodetector may be a photodiode, photomultiplier tube (PMT), a silicon photomultiplier or avalanche photodiode or other suitable light detecting device. Currently, PMTs are sometimes preferred to photodiodes because they are more sensitive to very low levels of light. For other applications the use of rapid count rate photodetectors such as silicon photomultipliers or avalanche photodiodes may be preferable.

The photodetector generates an electrical signal in response to light entering it through an optical window. The wavelengths detected by the photodetector should be matched as far as possible to the wavelengths generated by the scintillator to maximise the detection efficiency. Normally a photodetector is provided for each scintillator so that the amount of radiation detected by each scintillator can be measured independently of the other scintillators. The photodetectors are held in position by attachment means such as a clamp or mounting. When more than one photodetector is present, they may be mounted in fixed positions within a mounting block. The mounting block is formed from a material which is impermeable to light and to any other radiation which is likely to affect the signal produced by the photodetector. The photodetector is mounted with its optical window optically coupled to a collecting surface of the scintillator. The photodetector may be coupled using an optically coupling adhesive. Selection of a suitable optical coupling material such as an adhesive having some resilient elastic properties can provide the detector unit with some resistance to the effects of vibration or impact shock. Normally the photodetector is adjacent the scintillator, but it may be physically separated from the scintillator if light transmitting means are provided to transmit light from the scintillator to the photodetector. In that case it is important that the efficiency of the light transmission is as high as possible.

The photodetector may be in a coaxial relationship with its respective scintillator and collimator. Alternatively, the photodetector may be mounted at an angle to the axis of the collimator and scintillator, for example at an angle of between about 45 and 100 degrees to that axis, especially about 90°. One advantage of mounting the photodetector at an angle to the axis of the scintillator and collimator is that the total depth of the detector unit may be reduced compared with a detector unit in which the photodetector is mounted coaxially.

Reducing the depth of the detector unit helps to minimise the space needed around a target structure to be scanned and this can allow scanning in restricted spaces.

In a preferred embodiment of the invention an array of n detector units is provided, comprising an array of n radiation detector comprising:

n scintillators, n photodetectors, each photodetector being optically coupled with a respective scintillator, a detector block made of highly attenuating material incorporating a plurality of n channels extending through the detector block from a first surface to a second surface, each channel being sized to accommodate a single scintillator, and a collimator block comprising a block of shielding material having n channels extending therethrough, and wherein the collimator block is joined to the detector block so that each channel is in register with a scintillator;

wherein each scintillator is located within a channel in the detector block, and where n=an integer in the range from 2-150.

Each detecting surface preferably forms a tangent to an arc of a circle having a radiation source as its origin. In one embodiment, each detector surface forms a tangent to the surface of a part of a sphere having the radiation source as its origin.

The apparatus of the invention preferably comprises at least one source unit. Each source unit comprises a source of penetrating radiation, a source-holder and optionally further a collimator. The collimator and source-holder may be combined. The collimator is formed of a material which is highly attenuating to the radiation emitted by the source and is normally formed of a heavy alloy material of the type known and commonly used for shielding radiation of the appropriate energy and type. The collimator is located and adapted to limit the radiation emitted by the source unit to a predetermined beam shape and direction. Preferably the radiation beam is shaped by the collimator to form a fan, cone or frusto-cone, or sector in each case having the source as origin. A preferred beam shape is a cylindrical sector, i.e. a sector having a thickness rather than being planar. Preferably the beam is collimated to provide a beam area at the location of the detector(s) which has the same general shape and area as the combined detecting surface(s) of the array of detectors. In the preferred form of the apparatus, the source unit is mounted on a support, preferably in the region of an end of an elongate support.

The radiation source is selected by the transparency to the radiation of the material(s) to be measured, e.g. a vessel and/or its contents (i.e. the attenuation coefficient of the medium) and the availability of suitable sources and detectors. For scanning large solid structures such as process vessels and pipelines, suitable sources of gamma include $^{60}$Co and $^{137}$Cs, $^{133}$Ba, $^{241}$Am, $^{24}$Na and $^{182}$Ta, however any gamma-emitting isotope of sufficient penetrating power could be used, and many such are already routinely used in density gauges, such as those used as level measurement devices. Usually, the half-life of the radioisotope used will be at least 2, and desirably at least 10, years. The half-lives of the radioisotopes mentioned above are: $^{137}$Cs about 30 years, $^{133}$Ba about 10 years and $^{241}$Am about 430 years. Suitable sources generally emit radiation at energies between about 40 and 1500 keV.

The source unit may include one or more than one source. The scanning method may utilise more than one source if required.

The apparatus further comprises a data collection and processing means associated with the detector and for example a data processor for operating on the electrical signal from the detectors. Signals representative of the counts of photons detected by the scintillators are processed by the data processor. The signal is corrected for dead time in accordance with the above. The signal may additionally be subjected to smoothing or stabilisation algorithms, averaged or otherwise operated on according to standard practices.

A data processor may perform calculations based on the signal from the radiation detector or from a signal processor if present. The data processor may output information concerning the amount of radiation measured over a time interval, or it may further calculate derived properties of a scanned structure, for example in the form of a bulk density or a change in bulk density between radiation paths through the structure. In such a case the scanning method is preferably carried out on a target structure at a plurality of radially offset positions around the structure so that density data may be acquired at a variety of angles through the structure and a tomography algorithm may be used to provide information about the changes in density at different paths through the structure. In a preferred form the data from the detectors is operated on by the data processing unit using tomography algorithms in order to produce a graphical representation of the density or composition of the target structure along different paths. The data processor may contain a calibration or information concerning the radiation source. The data processor output is may be connected a display or a (optionally wireless) transmission means so that a signal can be sent from the apparatus to a remote location. Alternatively, a signal comprising data from the radiation detector itself may be sent, for processing at a remote location. A power supply is provided to power the photodetectors, data processor and control electronics and also to power motors for moving the apparatus.

The invention may find particular applicability in the scanning of pipelines or other large structures with high energy gamma radiation, for example in sub-sea locations.

In accordance with such application, the invention relates to a method of scanning a structure to detect its physical properties and to an apparatus adapted for scanning a structure to detect its physical properties. In particular, the invention relates to a method of scanning an elongate structure, such as a pipeline, to detect changes in its material density which may indicate variations in wall thickness caused by corrosion or erosion or to deduce information about the contents of the pipeline such as the build-up of deposits or the nature of fluid flowing within the pipeline, and to an apparatus for such scanning of an elongate structure. Typically, the method and apparatus concerns the measurement of density of a structure by means of detecting radiation emitted by a radiation source by a radiation detector The present invention in a more complete aspect provides a method of scanning a structure to detect changes in density between different parts of the structure comprising the steps of:

(a) providing at least one source of gamma radiation, and a plurality of detector units capable of detecting said gamma radiation, each said detector unit comprising: a radiation detector comprising a scintillator comprising a scintillating material; a photodetector for detecting light emitted by the scintillator in response to gamma radiation, and a collimator placed between the scintillator and the source of radiation;

(b) causing said source to emit gamma radiation along a predetermined radiation path towards said detector, wherein said path passes through at least a portion of said structure;

c) for each detector separately:
detecting successive count events corresponding to photons of gamma radiation detected by the detector; measuring a duration of each such count event to determine a dead time associated with each count event;
determining a photon count rate from the total number of count events during the measurement period;
determining a total dead time for the measurement period as the sum of each dead time associated with each count event;
determining a photon count rate from the total number of count events during the measurement period;
calculating a corrected count rate by applying a correction factor based on subtracting the total dead time from the measurement period;

e) calculating a density value for each path from the corrected count rate of photons detected by the detector associated with the respective path.

The present invention in a more complete aspect also provides an apparatus for scanning a structure to detect changes in density between different parts of the structure comprising:
at least one source unit comprising a source of gamma radiation and shielding material arranged to restrict the emission of gamma radiation from the source unit;

a plurality of detector units capable of detecting said gamma radiation, each said detector unit comprising:
a radiation detector comprising a scintillator comprising a scintillating material, a photodetector for detecting light emitted by the scintillator in response to gamma radiation, and a collimator placed between the scintillator and the source of radiation;

and data processing means for, for each detector, separately:
detecting successive count events corresponding to photons of gamma radiation detected by the detector;
measuring a duration of each such count event to determine a dead time associated with each count event;
determining a photon count rate from the total number of count events during the measurement period;
determining a total dead time for the measurement period as the sum of each dead time associated with each count event;
determining a photon count rate from the total number of count events during the measurement period;
calculating a corrected count rate by applying a correction factor based on subtracting the total dead time from the measurement period;
and calculating a density value for each path from the corrected count rate for the detector associated with the respective path.

The method of the more complete aspect of the invention for example includes the method of the first aspect of the invention and the apparatus of the more complete aspect of the invention for example includes the apparatus of the second aspect of the invention. The apparatus of the more complete aspect of the invention is suitable for use in the scanning method of the more complete aspect of the invention, in which a target structure is scanned to detect changes in its shape or composition by means of passing radiation emitted by a radiation source through the structure and detecting radiation after it has passed through the structure.

The scanning method works on the well-known principle that the amount of radiation attenuated or scattered by an object is related to the mass of material the radiation has passed through. By measuring the amount of radiation detected through each selected path through the target structure it is possible to calculate and/or compare the density of the structure along one radiation path with the density of the structure along a different radiation path. By "density value" we mean a value which represents the actual or relative density of the structure which lies on a particular path from the source to a particular detector. The density value is based on a number of counts of gamma photons calculated from the corrected count rate for the detector. The density value may be expressed graphically, including as an image or part thereof. The relative dimensions of the scintillator(s) of the radiation detector of the invention allow a plurality of scintillators to be placed in close proximity in order to achieve a high degree of spatial resolution of detected radiation so that characteristics of small portions of the structure may be detected with high precision. The method is particularly useful for scanning a regular structure such as a pipe, although the method and apparatus may be used for scanning other types of structure. In a particular embodiment of the invention, the scanning method is a method of detecting changes in the density of the wall of a pipeline. Use of this method enables flaws such as voids, cracks, scale, gas hydrates or thinning to be detected. The change in density may be detected relative to adjacent portions of the pipe wall or relative to a reference value generated from a model pipeline or a calculated value.

In the scanning method of this aspect of the invention, an array of detector units is mounted opposite at least one source of gamma radiation such that the radiation is emitted in the direction of the detecting surfaces. The target structure to be scanned is capable of being interposed between the source and detector unit so that the radiation emitted by the source can pass along a plurality of paths through a portion of the structure and impinge upon the detecting surfaces. The source and detector unit may be moved relative to the target structure (or vice versa) in order to scan different portions of the structure. The principal benefit of using an array of detectors is that different paths through the structure may be scanned simultaneously. Each of the paths has the shape of a frustum, having the source at the apex and the detecting surface of a detector at the base. Each detector in the array defines a different path through the structure so that the number of paths which may be scanned simultaneously is equal to the number of detectors in the array. The number of detectors in a detector array may vary from fewer than 10 to more than 100, e.g. up to 150, depending on the application for which the scanning method is to be used. In practice, the mass of shielding material required to shield and collimate a large number of detectors may provide a practical upper limit to the number that can be used.

The source unit and detector unit may be mounted on a support in fixed relationship to one another or the detector unit may be movable relative to the source unit. It is greatly preferred that the source unit and detector unit are mounted in a fixed relationship when the apparatus is in operation. This enables the apparatus of the invention to provide a precise and fixed alignment of source and detector units so that modulation of the counts measured by the detectors can be attributed solely to the materials between the source and detector through which the radiation path passes. In this way, very small differences in the density of such materials can be detected, allowing the detection of small flaws or changes in the thickness of a pipeline wall. The source and detector unit are preferably mounted so that the detecting surface(s) of each of the detectors form a tangent to an arc having the source at its origin. The plurality of detector units are arranged in close proximity to each other. It is preferred that the array of detector units is arranged in the form of an arc having a radius centred on the centre of the object or structure to be scanned. The design of the detector unit preferably minimises the total distance on each detection path through each detector unit in order to make the array of detector units as compact as possible, whilst maintaining sufficient depth of the collimation and a detector for efficient detection of gamma photons on each path.

In a preferred form of the invention, the source unit and detector units are mounted on a support which provides means for the structure to be scanned, or a portion thereof, to be located between the source unit and the detector unit. The support maintains the source unit and detector unit in a spaced apart fixed relationship. The support therefore includes means for mounting at least one source unit and means for mounting a plurality of detector units on the support. The support may comprise an elongate portion or "arm" having first and second opposed ends to which said detector unit and support unit may be mounted or joined. The means for mounting a detector unit comprises a detector housing joined to the support. The support, source unit, and/or detector housing may be formed as a unitary component or from separate components which are joined together. The support must be sufficiently strong to withstand supporting and moving the detector and source units without deformation and sufficiently rigid to maintain a precisely fixed relationship between the source unit and detector housing, including any detector units housed therein. One suitable material for the support comprises an aluminium alloy, which may be machined by known methods to form the required shape for the support.

The detector housing is shaped to house one or more detector units and to secure such units so that they do not move unintentionally, during operation of the apparatus. It is an important feature of the preferred apparatus that the detector units can be maintained in a fixed relationship to the source during use in a scanning method. The detector housing may be of such size and shape to house several detector units at the same time, for example from 2-100 units. The detector housing may include means to house a detector unit in more than one position within the housing. The means may simply comprise a detector housing having sufficient space to house a detector unit in more than one location within the housing. Means, such as guide rails or a motor may also be included to move one or more detector units from a first location within the housing to a second location within the housing. A practical limit on the resolution of a scanning method using an array of detectors is that the spacing between each one must be sufficient to allow a minimum required amount of shielding to ensure that each detector is adequately shielded from photons impinging on a neighbouring detector. Even when highly dense alloys are used for detector shielding, we have found that a practical limitation on detector spacing is approximately 1 degree of arc. In one embodiment of the apparatus, the detector housing is of such a size as to allow a detector unit to be housed in at least two positions, offset from each other by a distance which is a fraction of the distance between the detectors. When the fraction is 0.5 of the detector spacing distance (0.5 s), the resolution of the apparatus may be doubled by carrying out a first scan when the detector array is in a first position in the housing and then repeating the scan when the detector array is in a second position in the housing which is offset from the first position by 0.5 s. If additional positions are provided, and or, the angular distance between them is reduced, additional scans can provide additional data to enhance the resolution of the scan. The detector may be moved between any of the at least two positions, for example by operation of a powered switch operated by a solenoid. The provision of means to lock the detector array securely in a single position whist scanning is greatly preferred. Such means may comprise a sprung pin or boss engaging with an indexing hole in each of the desired positions.

In a particularly preferred form, the apparatus comprising support, detector housing (including any detector unit therein) and source unit may be moved laterally and/or rotationally, relative to the structure and means are provided to effect such movement. Preferably the source unit and detector units are rotated around the structure such that the radius of rotation has an origin within the structure, for example the origin may be approximately at the geometric centre of the structure in the plane of rotation. The means for said movement may include motorised or manual impulsion and guiding means such as rails, tracks, guide channels or locating indicators, to guide the path of rotation. Preferably the apparatus is provided with at least one track or rail, shaped to conform to at least a part of the structure to be scanned. For pipeline scanning, for example, one or more arcuate tracks may be provided so that the apparatus may be moved along the tracks, for example by means of a worm drive or a stepper motor turning a splined drive-wheel, gear or cog to rotate the detector housing and source around the circumference of the structure. In a preferred form, the guiding means is indexed, for example by providing indentations into which teeth of a drive cog may engage to effect movement of the scanning apparatus. The provision of indexed movement may provide a predetermined number of scanning locations at known angular positions around the structure. Preferably a means is provided to rotate the detector units and source around a circumference of the structure to be scanned. In the case of a cylindrical object, such as a pipeline, the detector units and source are rotated around the circumference of the pipeline. The scanning method is carried out at a plurality of radially offset positions around the structure so that density data may be acquired at a variety of angles through the structure.

The guiding means, e.g. tracks, may extend partially or entirely around the pipeline. It is preferred to move the source and detector unit continuously around the structure in order to avoid the problems, such as damage to the apparatus or slippage of the scanning system, associated with successively accelerating and braking the apparatus. More than one scan may be required to gather sufficient data to determine the structure properties, although the number of scans and the scanning time is dependent upon the density and mass of material through which the radiation must travel from the source to the detector units. Preferably a continuous rotational movement around the structure at a relatively low rpm, for example at from about 1 to about 20 rpm, especially from 1-10 rpm is maintained during the scanning operation. Therefore in a preferred apparatus means such as a continuous track are provided to enable such movement. The guiding means may be provided in more than one part, which, following deployment of the apparatus, are brought together and optionally joined, to form the desired length of track for scanning. The source unit, detector unit, support and guiding means may all be housed within an enclosure which is capable of surrounding at least a part of the structure. The enclosure may have an open position in which it may be positioned around the structure and a closed position in which it is capable of scanning the structure. The enclosure may take the form of a hinged pair or set of jaws which may be clamped to the structure to be scanned.

Power may be recovered from the movement of the apparatus by means of a dynamo, or similar, which may be then used to help power the detectors or other operating systems of the apparatus.

Movement of the apparatus may also involve lifting and/or sliding the apparatus manually or by mechanical means, for example by means of a remotely operated vehicle (ROV). An ROV may be preferred to deploy and move the apparatus when deployed in remote or underwater locations. Linear movement, for example parallel to the axis of a pipeline or a vessel, may be achieved by means of a crawler mechanism or using a track or rails, or alternatively by external means such as a lifting apparatus or ROV. The movement means may include indexing, for example at a particular angular separation in order to provide a predetermined number of scanning locations at known positions around the structure. For an application such as scanning a pipeline, the movement may be controlled by means of a programmed electronic control unit, for example to execute a predetermined timed movement or set of movements of the source and detector units relative to the pipeline. The movement may be rotational to scan around the circumference of the pipeline and/or lateral to move axially along the pipeline.

The apparatus may comprise means to support the apparatus in proximity to the structure to be scanned. Such means may comprise clamps, which are capable of engaging the structure and supporting the scanning apparatus in one or more positions on the structure. The clamps may be manually operated but mechanically operated clamps are preferred.

In use in the scanning method of the invention, the apparatus is deployed so that the source unit and detector units are positioned in relation to the structure to be scanned so that one or more radiation paths from the source to detectors in the detector unit pass through the desired portion of the structure. The amount of radiation, in the form of counts, is measured by the detector in each detector unit deployed in the apparatus. The scanning method is carried out at a plurality of radially offset positions around the structure so that density data may be acquired at a variety of angles through the structure. The apparatus may then be moved to a different location or orientation with respect to the structure and the measurement is repeated. In this way a record of the attenuation to radiation through each radiation path through the structure may be gathered and used to calculate the location of changes or to build a representation of the structure and its contents. Information such as changes in density which may highlight flaws or other features within the structure can be obtained from the data gathered from the detectors using data analysis tools known for use in tomography methods.

For operation underwater, it is preferred to increase the buoyancy of the apparatus by means of a buoyancy block. If used, the buoyancy block may be attached to the apparatus by means of a flexible attachment so that the flotation force produced can be balanced during movement of the apparatus. Additionally, or as an alternative, spaces within the apparatus may contain a foam material in order to provide positive buoyancy to the apparatus. Parts of the apparatus may be coated in a resilient foam material, again for the purpose of providing buoyancy and also to protect the apparatus from physical damage, such as impact damage, and environmentally induced damage such as corrosion.

It will be appreciated that features described in relation to one aspect of the invention may be equally applicable to other aspects of the invention. For example, features described in relation to a method of detection of radiation or to a method of scanning may be equally applicable to an apparatus of the invention and vice versa. It will also be appreciated that optional features may not apply, and may be excluded from, certain aspects of the invention.

DESCRIPTION OF THE DRAWINGS

The invention will be further described by way of example only with reference to the following figures, which are.

DETAILED DESCRIPTION

Figure 1A:
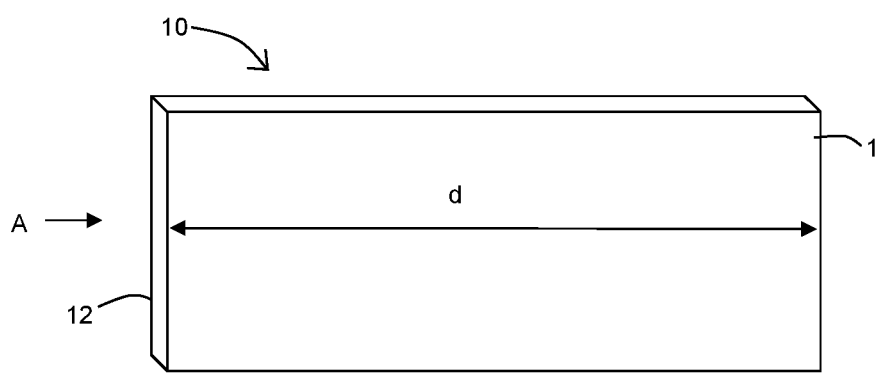
FIG. 1A: a schematic view of a scintillator suitable for use in the method and apparatus of the invention.
Figure 1B:
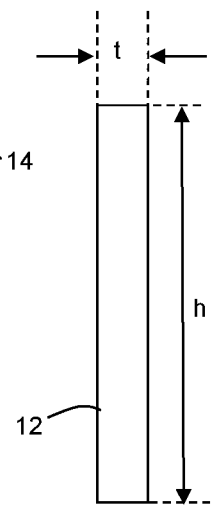
FIG. 1B: A view of the scintillator of FIG. 1A from direction A.

The invention is described by way of example with reference to a suitable apparatus to which the principles of the invention could be applied, comprising an apparatus for scanning a pipeline, elongate process vessel or the like in which a beam of gamma radiation from a source is emitted through the target object to be detected by an array of detectors which are each collimated to detect radiation over a narrow angle relative to the width of the emitted radiation beam. The principles of the invention are particularly suited to such a device, in particular in that they allow the dead time correction to be applied individually to each sample within each detector for each position of the multi-detector scanner. However, the principles of dead time correction embodied in the invention are not limited to such multi-detector scanners, but can be applied in any situation where a dead time correction is required FIGS. 1A and 1B show a BGO scintillator crystal 10 having a thickness t of 5 mm, a height h of 30 mm and a depth d of 75 mm. The detecting surface 12 is opposite the collecting surface 14. All surfaces of the crystal except the detecting and collecting surfaces are coated in a highly reflective coating.

Figure 2:
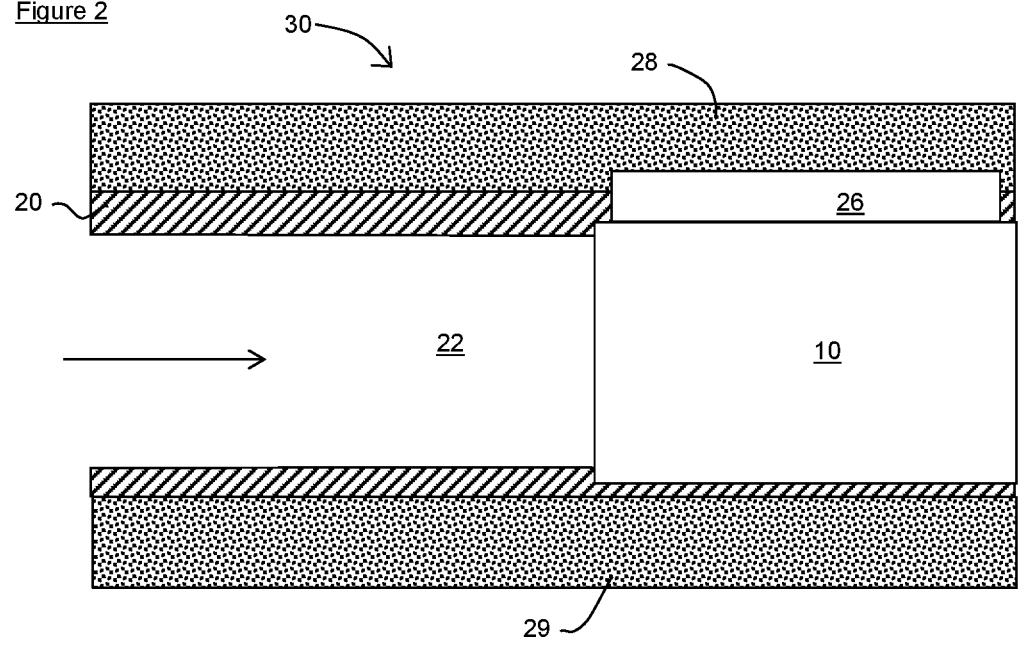
FIG. 2: a schematic view through a section of a detector unit.

FIG. 2 shows, a transverse cross-section through an example detector unit 30. The detector unit comprises a stainless steel block 20 which defines a collimation channel 22. In use, a scintillator crystal 10 is housed within the block, with its collecting surface optically connected to a photo-detector 26. The photodetector may be a photodiode, photomultiplier tube (PMT), silicon photomultiplier, avalanche photodiode or other suitable light detecting device. The illustrated embodiment uses a silicon photomultiplier array 26. The SiPM array is mounted out of alignment with the radiation direction in order to reduce the total depth of the detector unit. The direction of radiation is indicated by the arrow. Suitable processing electronics, including an ADC, FPGA and suitable processor to perform the correction calculations (not shown) are connected in series to the SiPM array.

Figure 3:
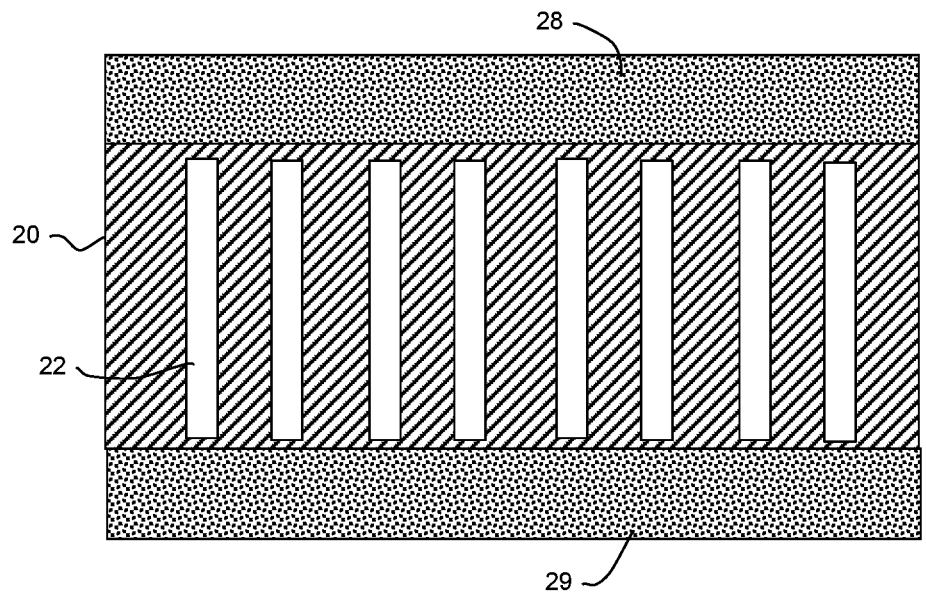
FIG. 3: a view of a front elevation of the detector unit of FIG. 2.

FIG. 3 shows an elevation from the direction of the arrow. Layers 28 and 29 of a dense heavy alloy shielding material are positioned above and below the steel block 20. This material provides additional shielding for the detectors from scattered radiation impinging on the detector unit.

The example embodiment makes use of an inorganic scintillator crystal. Alternative scintillators, and in particular plastic scintillators, may be substituted. The example embodiments make use of silicon photomultipliers. Alternative photodetectors, and in particular photomultiplier tubes, may be substituted.

A possible scanning apparatus to which the principles of the invention could be applied, and in which plural detector units as exemplified above could be embodied, is described in WO2013/064838. This describes an apparatus for scanning steel pipe including two arcuate arrays of detector units. Detector units as above described could be deployed in such arcuate arrays in a similar scanner.

Figure 4:
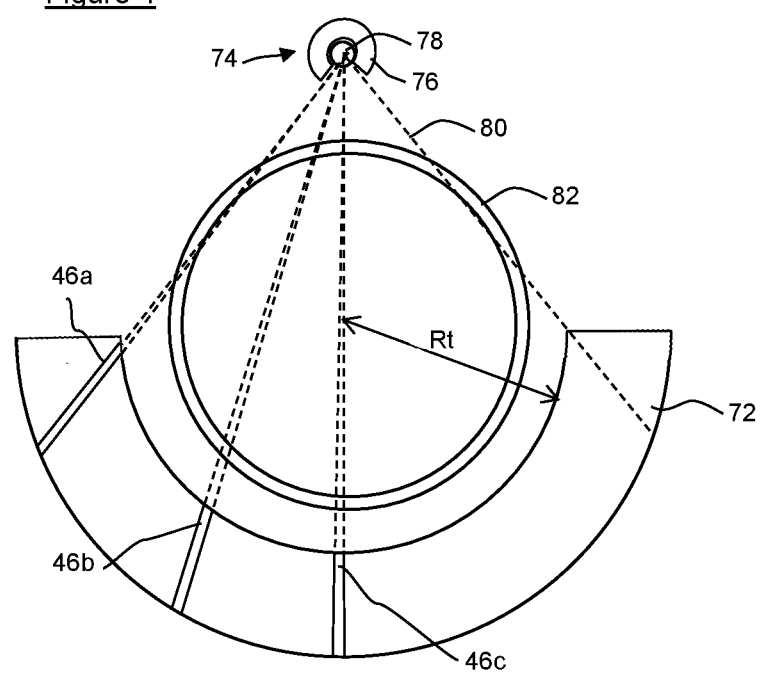
FIG. 4: a diagrammatic view of a preferred arrangement of an apparatus according to the invention.

FIG. 4 shows a schematic of such a scanner housing an arcuate array of detector units as above described in a generally arcuate shaped detector housing 72, formed of an aluminium alloy, and a source unit 74 spaced apart from the detector array with a cylindrical structure 82 to be scanned seated between the source unit and the detector array. The direction of three collimator channels 46a, 46b, 46c of detector units as above described is illustrated in order to show that they align with the direction of the source and are not aligned with the radius Rt of the structure 82. A source and detector housing is arranged to rotate about a central point on the structure 82 on a path having a radius Rt. The source unit comprises a caesium source of gamma radiation 78 surrounded by heavy alloy shielding material 76 including a slot for collimating radiation in a fan shaped beam 80 towards the detector housing. The detector housing comprises an aluminium alloy cage and, in the embodiment shown, contains two arcuate arrays of detector units.

In the detector housing shown, there is space for one or more detector units to be placed in the central portion of the housing. In that position, a detector unit would detect radiation which has passed through the lumen of the pipe and its contents. Use of a detector unit in such a position would therefore be suitable for conducting tomography scans of the pipe and contents.

The apparatus is provided with data collection and processing electronics, including an FPGA, which count the nucelonic events for each detector. In an embodiment an array of 95 detectors is provided. The sample period for each of the detectors is synchronised according to the rotational position of the instrument, so that each sample contains the counts accumulated whilst the instrument was located in a 0.25 degree sector of the rotation. For each sample, the counts are accumulated using a counter in an FPGA, from a circuit which performs sample-and-hold fed into an ADC. Once the ADC sampling process is completed, the circuit restores normal functionality so another event may be sampled. The duration of this sampling process is measured and added to the sample total dead time accumulator. At the end of the sample period, the total duration of dead time is subtracted from the sample duration to determine the corrected sample duration for use in the dead time correction calculation. The reported count rate for the detector is a result of the correction calculation only for the counts within the measurement window (where the signal amplitude is within upper and lower bounds), however the dead time duration is correctly measured from all events, regardless of whether or not they are within this desired range. The reported corrected sample count value is based upon the corrected count rate over that sample period.

The following calculations are thus performed:

corrected_sample_duration=sample_duration−sample_dead_time
corrected_windowed_count_rate=windowed_counts/corrected_sample_duration The corrected count data is then further processed and may be used to produce a tomography image or an indication of one or more properties of the pipeline at different locations around the path of the scanning operation. When sufficient data has been acquired, the housing is opened and moved to a different location along the pipeline for new scanning data to be acquired.

The invention claimed is:

1. A method of detection of radiation emitted by a radiation source by a radiation detector, the method comprising:

providing at least one source of radiation;
providing a plurality of detectors capable of detecting radiation from the source; and
causing said source to emit radiation along a predetermined radiation path towards said detectors;
wherein during a measurement period, for each detector separately, the method comprises
detecting successive count events corresponding to photons from the source detected by the detector;
measuring a duration of each such count event to determine a dead time associated with each count event;
calculating a total dead time for the measurement period as the sum of each determined dead time associated with each count event;

determining a photon count rate from the total number of count events during the measurement period; and, calculating a corrected count rate by applying a correction factor based on subtracting the total dead time from the measurement period.

2. The method according to claim 1 wherein the radiation is x-ray radiation or gamma radiation.

3. The method according to claim 1 wherein each of the detectors comprises a scintillator and a photodetector.

4. The method according to claim 1 wherein the detection of successive count events is performed by a pulse height threshold/peak analysis.

5. The method according to claim 4 wherein an event is counted when a pulse amplitude rises above a predetermined measurement threshold value, a peak pulse height for the event is measured, and an event duration is measured as the time duration that the pulse amplitude remains above the measurement threshold value or alternatively for the time duration that the pulse amplitude remains above some second predetermined threshold value.

6. The method according to claim 5 wherein a dead time for the event is determined to be the measured event duration or a period functionally related to the measured event duration.

7. The method according to claim 4 wherein the total number of count events during the measurement period is determined by: specifying a predetermined measurement window comprising an upper and lower bound for peak pulse amplitude, and recording a count event only for events where the pulse amplitude is between the said upper and lower bounds.

8. The method according to claim 1 wherein a cumulative count register and a cumulative dead time register are maintained and for each count event, the count register is incremented by one and the dead time register is incremented by the determined dead time.

9. The method according to claim 8 wherein at the end of the measurement period a reported total count is produced from the count register and a reported total dead time from the dead time and these are used to calculate a corrected count rate.

10. The method according to claim 1 wherein the detector is operated at a plurality of sampling energies.

11. The method according to claim 10 wherein a separate calculated correction is applied at each sampling energy.

12. An apparatus for detection of radiation emitted by a radiation source by a radiation detector, the apparatus comprising:
at least one source of radiation;
a plurality of detectors capable of detecting radiation from the source;
data collection and processing means associated with the detectors, the data collection and processing means being configured, for each detector separately, to:
detect successive count events corresponding to photons from the source detected by the detector;
measure a duration of each such count event to determine a dead time associated with each count event;
calculate a total dead time for the measurement period as the sum of each determined dead time associated with each count event;
determine a photon count rate from the total number of count events during the measurement period;
calculate a corrected count rate by applying a correction factor based on subtracting the total dead time from the measurement period.

13. The apparatus according to claim 12 further comprising a cumulative count register and a cumulative dead time register.

* * * * *